July 28, 1964     J. J. ZELENITZ     3,142,464
TREE MOISTENING TREE HOLDER
Filed Oct. 26, 1961
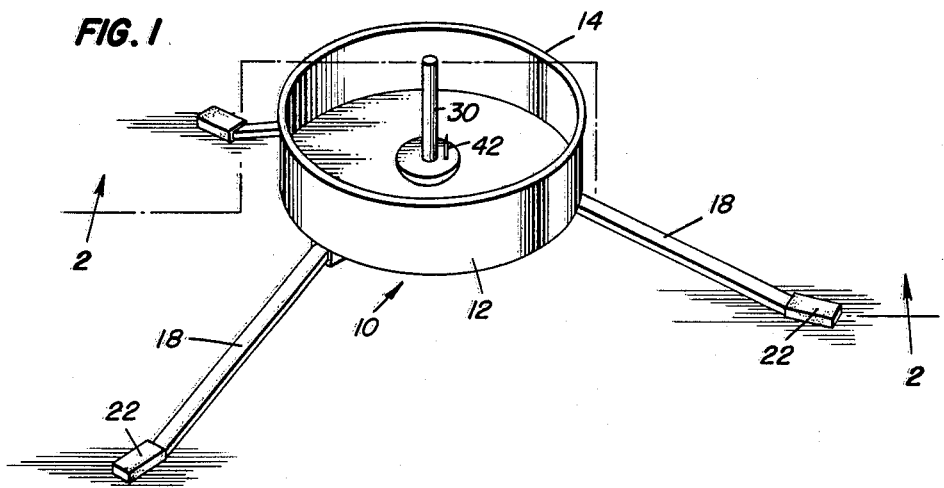
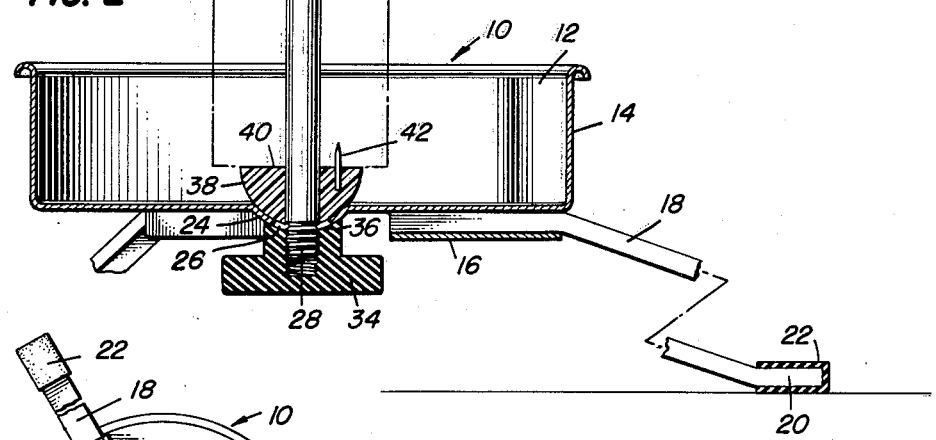
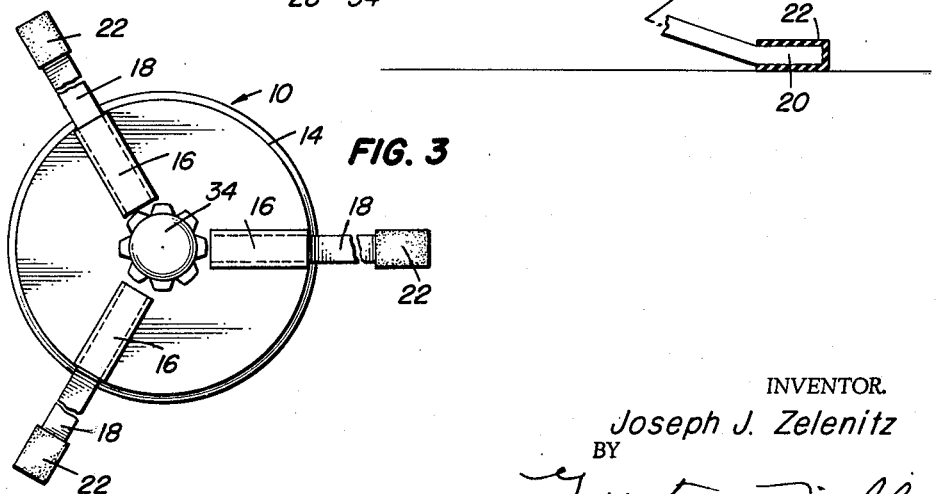
INVENTOR.
Joseph J. Zelenitz
BY

United States Patent Office 3,142,464
Patented July 28, 1964

3,142,464
TREE MOISTENING TREE HOLDER
Joseph J. Zelenitz, P.O. Box 287, Blaine, Ohio
Filed Oct. 26, 1961, Ser. No. 147,805
2 Claims. (Cl. 248—48)

This invention relates to a tree moistening tree holder and has for an object to provide an improved holder particularly intended for Christmas trees, which holder not only supports the Christmas tree, but also provides a means for keeping the tree moist to thus not only make it more fire resistant, but to prolong the life of the tree and prevent it from drying out during the normal period that it is usually kept on exhibition.

Still a further object of this invention is to provide a tree moistening tree holder having a tree supporting rod whose angle may be adjusted as necessary to compensate for any irregularity in the angle of the tree trunk, thus making it possible to use a Christmas tree whose trunk is somewhat at an angle.

A further object of this invention is to provide an improvement over the applicant's former Patent 2,997,264, of August 22, 1961, and to provide means for readily holding an ample supply of moisture into which the lower end of the tree trunk will continuously extend and to which it will be exposed, so that moisture may enter the tree trunk by capillary attraction.

Still a further object of this invention is to provide a tree holder having removable legs which when in position, extend a substantial radius from the support for the tree trunk, so as to provide a very stable base, and yet which are readily removable for storage when the tree holder is not in position supporting a tree.

With the above and related objects in view, this invention consists in the details of construction and combination of parts as will be more fully understood from the following description, when read in conjunction with the accompanying drawing, in which:

FIG. 1 is a perspective view of the tree holder of this invention, in position ready for receiving the trunk of a tree and the moisture to keep it from drying out.

FIG. 2 is a sectional view, partly broken away, of FIG. 1.

FIG. 3 is a bottom plan view of FIG. 2, partly broken away.

There is shown at 10 the tree holder of this invention, including a moisture or water holding pan 12 having a side wall or flange 14 of sufficient depth to hold an ample supply of moisture.

Radially secured on the bottom of the pan 12 are a plurality of leg receving sleeves 16, into each of which is removably secured a bent leg 18 extending out to a supporting foot 20 on which is mounted a rubber shoe 22.

As will be apparent from FIG. 1, the feet and rubber shoes 22 provide a stable base of a substantial area for the tree holder 10. At the center of the pan 12, there is provided a depending recessed boss 24 partly spherical in shape and apertured as at 26. Extending through the aperture 26 is a threaded end 28 of a tree-engaging rod 30, which will cooperate with the tree trunk 32 placed thereon by being telescopically received within a suitable bore axially formed in the bottom of the tree trunk 32.

A nut 34 is threaded on the threaded end 28, and the nut 34 has a surface 36 which is partly spherical and hence, complementary to the bottom surface of the partly spherical depending boss 24. A partly spherical supporting flange 38, having a surface complementary to the concave side of the depending flange 24 is mounted about the bottom end of the rod 30 just above the threaded end. Extending from the flat upper side 40 of the supporting flange 38 is a pin 42, which will also penetrate the end of the tree trunk 32 when it is placed in position on the rod 30, and thus prevent the tree trunk 32 from accidentally rotating about the rod 30, particularly if the aperture or bore in the tree trunk 32 should be slightly too large.

In operation, when ready to be put into use, the legs 18 with their rubber shoes 22 on the feet 20, are each inserted in the leg receiving sleeves 16, and the rod 30 with the flange 38 in position thereon has its threaded end 28 inserted down through the aperture 26 and the nut 34 is tightened thereon, with the rod 30 usually extending vertically therefrom, but should the tree trunk 32 be somewhat angular or bent, the angle of the rod 30 may be adjusted by slightly loosening the nut 34 and changing the angle of the rod 30, this being permitted by the presence of the aperture 26. When it is at the proper angle, the nut 34 will be tightened so as to bring the flange 38 tightly down against the concave side of boss 24 to make a waterproof joint.

Obviously, the support flange 38 may be of slightly flexible material such as semi-hard rubber, or slightly flexible suitable plastic material to assist in making a water tight connection for closing off the aperture 26. Then, when the tree 32 has had an aperture bored axially thereof of suitable length, it is set down over the rod 30, with the lower end of the tree trunk 32 penetrated by the pin 42 to firmly hold the tree trunk 32 in position and prevent rotation thereof. Thereafter, water is placed in the pan 12 to a suitable height above the bottom of the tree trunk 32, and this water will, by capillary action, keep the tree trunk 32 and the needles on the tree moist and life-like throughout the usual Christmas season for which it is used, thus not only enhancing the appearance of the tree, but tending to make it fire resistant, particularly when suitable fire resistant chemicals are placed in the water within the pan 12, such fire resistant chemicals being well known for this purpose.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A tree moistening tree holder comprising a flanged pan, a plurality of leg receiving sleeves mounted on the bottom of said pan, a leg removably secured in each of said sleeves, an apertured partly spherical boss depending from the center of said pan, a threaded rod extending through the aperture in said boss, a nut having a surface complementary to said partly spherical boss and of greater area than said aperture therein threaded on the end of said threaded rod, a partly spherical flange mounted on said rod within said pan, said partly spherical flange being complementary to said depending partly spherical apertured boss of said pan, said rod being arranged to telescope within an apertured tree trunk to maintain the tree trunk thereof resting against the top of said flange mounted on said rod, said rod being angularly adjustable within said aperture, whereby said nut cooperating with said threaded rod, said apertured boss, and said rod branch, provides the sole means for adjusting and securing said rod and the tree thereon at the desired angle and also seals said apertured boss.

2. The tree holder of claim 1, and a pin extending parallel to said rod upwardly from said rod flange arranged to penetrate the tree trunk supported thereon and prevent rotation of the tree trunk.

References Cited in the file of this patent

UNITED STATES PATENTS

| | | |
|---|---|---|
| 2,671,624 | Carney | Mar. 9, 1954 |
| 2,720,770 | Bibeau | Oct. 18, 1955 |
| 2,746,700 | Barbera | May 22, 1956 |
| 2,908,461 | Coffeen | Oct. 13, 1959 |
| 2,933,274 | Mausolf | Apr. 19, 1960 |